(12) United States Patent  (10) Patent No.: US 7,825,830 B2
Joyner  (45) Date of Patent: Nov. 2, 2010

(54) SIMPLIFIED SELF-POWERED ATTITUDE SURVIVAL INDICATOR

(76) Inventor: Danny C. Joyner, 9561 Spanish Moss Rd., Lake Worth, FL (US) 33467

( * ) Notice: Subject to any disclaimer, the term of this patent is extended or adjusted under 35 U.S.C. 154(b) by 454 days.

(21) Appl. No.: 11/977,951

(22) Filed: Oct. 26, 2007

(65) Prior Publication Data

US 2009/0109064 A1 Apr. 30, 2009

(51) Int. Cl.
G08B 23/00 (2006.01)
G05D 1/08 (2006.01)
G01C 5/00 (2006.01)
G06F 7/70 (2006.01)
G06F 19/00 (2006.01)
G06G 7/00 (2006.01)
G06G 7/76 (2006.01)

(52) U.S. Cl. .............................. 340/967; 701/4; 701/9; 701/14

(58) Field of Classification Search ................. 340/945, 340/963–970, 973–980; 701/1–18; 345/31
See application file for complete search history.

(56) References Cited

U.S. PATENT DOCUMENTS 3,852,710 A * 12/1974 Hernandez, Jr. ............. 340/967
3,946,364 A * 3/1976 Codomo et al. ................. 701/3
4,160,339 A * 7/1979 Dankman et al. ........... 446/231
4,351,187 A * 9/1982 Foulks et al. .............. 73/178 R
5,281,960 A * 1/1994 Dwyer, III ................... 345/31
6,549,179 B2 * 4/2003 Youngquist et al. ........... 345/39
6,647,774 B1 * 11/2003 Youngquist .............. 73/170.02
7,239,942 B2 * 7/2007 Park et al. ...................... 701/1
7,305,772 B2 * 12/2007 Clark et al. .............. 33/366.27
2001/0028315 A1 * 10/2001 Frantz ........................ 340/945
2001/0039466 A1 * 11/2001 Katz et al. ...................... 701/4
2006/0238384 A1 * 10/2006 Hess et al. ............. 340/995.14

* cited by examiner

*Primary Examiner*—Jennifer Mehmood
(74) *Attorney, Agent, or Firm*—Robert M. Downey, P.A.

(57) ABSTRACT

This simplified self powered aircraft attitude survival indicator is easily and readily transportable from one aircraft to another and provides a simple indicator which gives a visual indication of aircraft attitude and alarms when the aircraft is in a dangerous attitude. The aircraft attitude indicator includes a housing containing a power source, multiple attitude sensors, and at least one piezoelectric alarm, and a front panel display with an arrangement of light emitting elements (electric bulbs or LEDs) providing visual attitude indicators.

16 Claims, 15 Drawing Sheets

ONE OF TWO IDENTICAL CIRCUITS

SIMPLIFIED SELF-POWERED ATTITUDE SURVIVAL INDICATOR

BACKGROUND OF THE INVENTION

1. Field of the Invention

This invention relates to self-powered gyroscopic and non-gyroscopic attitude indicators for use in personal or general aircraft, as well as Ultra-Light aircraft.

2. Discussion of the Related Art

Many devices have been developed to alert the pilot of an aircraft of changes in the attitude of the aircraft. These devices depend upon a gyroscopic device and resultant mechanical display of the horizon or attitude.

Gyroscopic devices are usually powered by air flow, vacuum, or electric motors. Failure of any of these power sources can render a gyroscopic attitude indicator inoperative. The gyroscopic attitude indicators presently used in most aircraft are generally very accurate, and although they have been simplified over the passing years, it takes practice to understand the gyroscopic indicator and interpret the significance of the display. What is needed is a simple indicator which gives a visual indication of aircraft attitude and provides suitable alarms when needed.

The present invention provides a simple indicator of aircraft attitude with a visual indication display that is easy to interpret. The indicator device is portable, self-powered and self contained. The attitude indicator device can be transferred between different aircrafts, without complicated electrical or mechanical attachments to the engines or the aircrafts.

OBJECTS OF THE INVENTION

The primary object of this invention is to provide a self-powered, portable and relatively inexpensive device that is adapted to provide an easy to interpret indication of the aircraft attitude simply by means of reliable LED or aircraft incandescent indicators.

SUMMARY OF THE INVENTION

The invention, directed to a simplified self-powered attitude survival indicator, consists of an enclosure which may be manufactured of plastic or metal, an internal or external power source, a plurality of internal attitude sensors, a plurality of piezoelectric alarms, a plurality of small aircraft bulbs or LED (Light Emitting Diodes) indicators, a power switch, and a variety of hook and loop fastening devices for easy attachment and removal of the attitude indicator from the aircraft. The aircraft attitude indicator device is usually placed in the field of view of the pilot. The internal attitude sensors may be switches, LVDT's potentiometers, accelerometers, mercury switches, or a combination of these elements, working together by means of electronic logic. Since there are no active oscillators, the aircraft attitude indicator does not produce electro-magnetic interference.

BRIEF DESCRIPTION OF THE DRAWINGS

For a fuller understanding of the nature of the present invention, reference should be made to the following detailed description taken in conjunction with the accompanying drawings in which.

Like reference numerals refer to like parts throughout the several views of the drawings.

DETAILED DESCRIPTION OF THE PREFERRED EMBODIMENT OF THE INVENTION

Indicators and Operation

Figure 1:
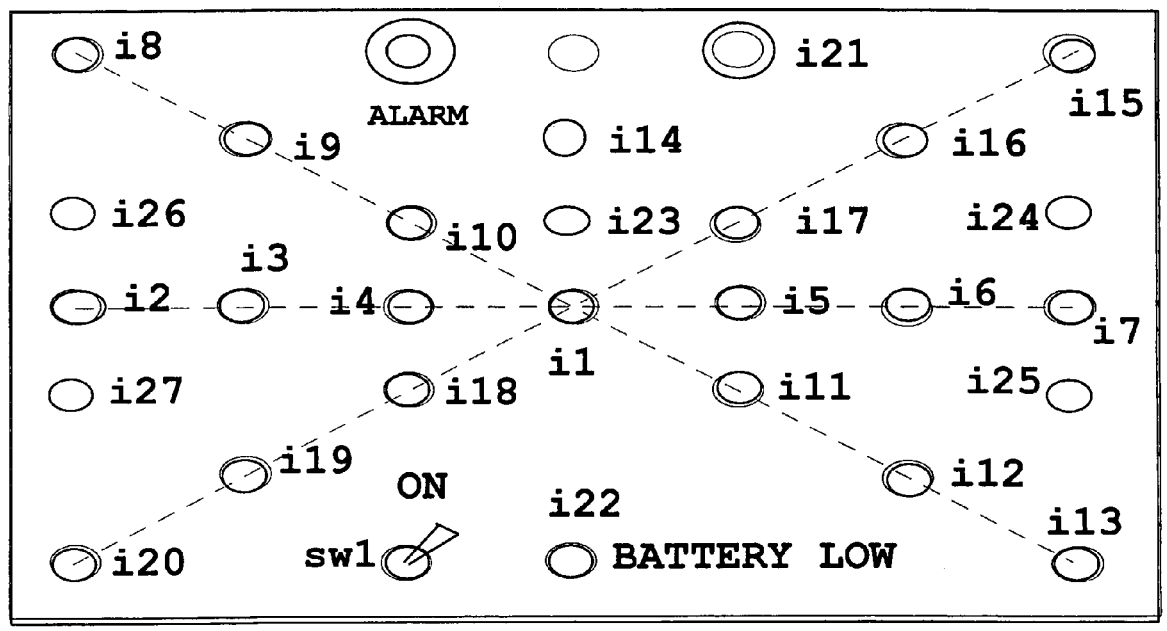
FIG. 1 is a front elevational view that illustrates the overall size and appearance of the front panel of the aircraft attitude indicator device, including the display described herein.
Figure 2:
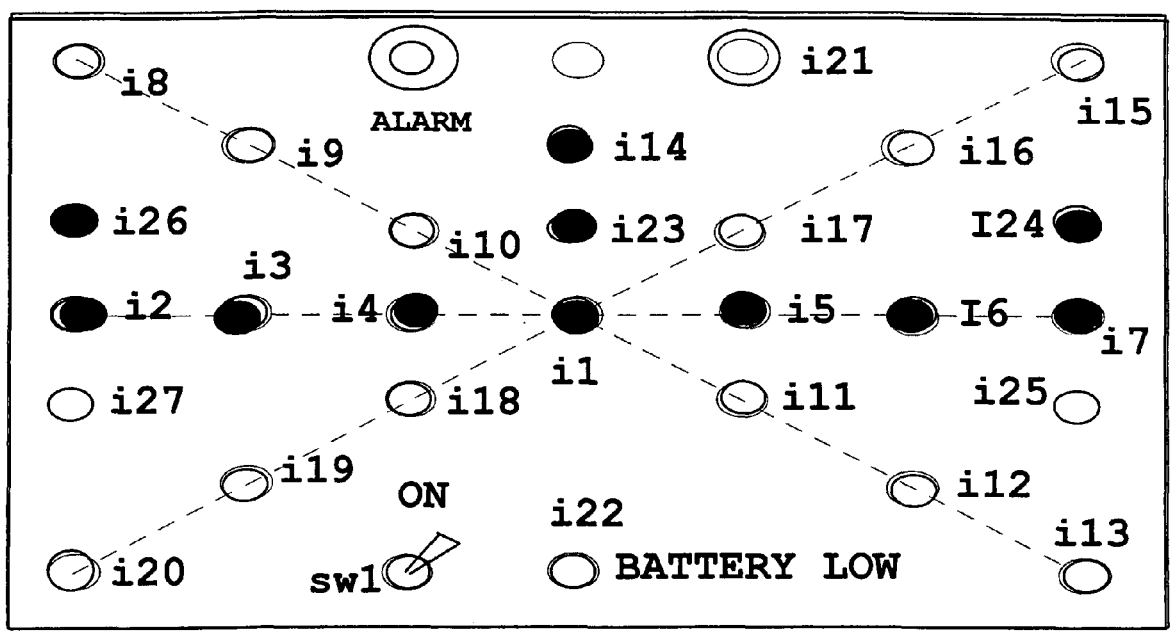
FIG. 2 illustrates the arrangement of activated indicator LED's or incandescent lamps on the display when the aircraft is flying in level flight and ascending.
Figure 3:
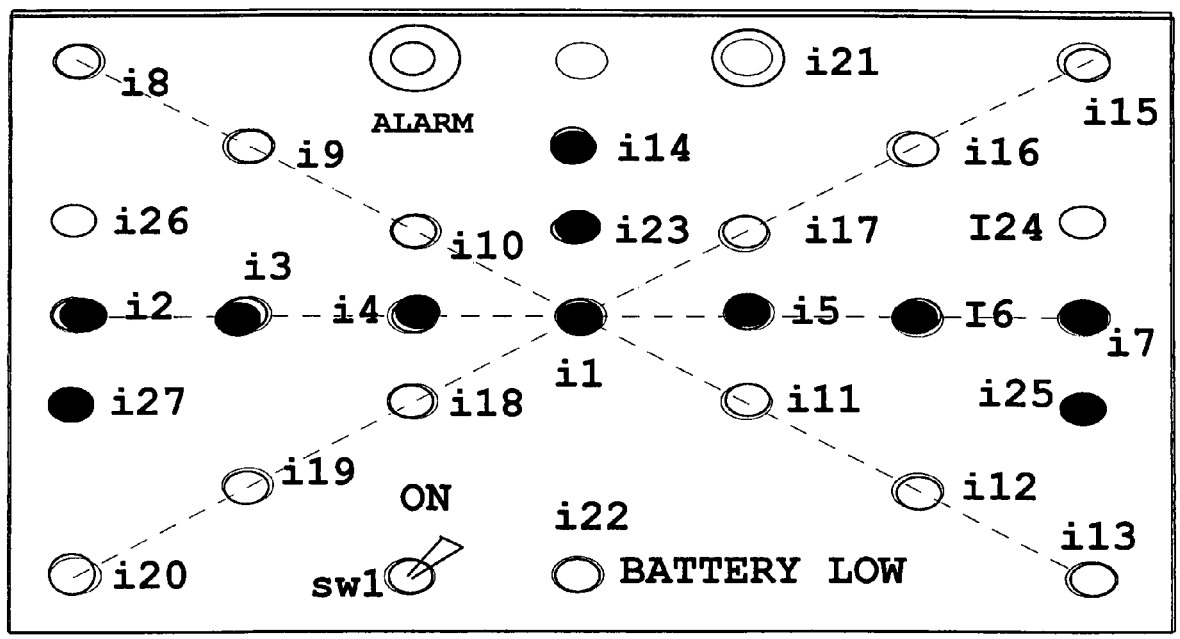
FIG. 3 illustrates the arrangement of activated indicators for level flight, nose down attitude.
Figure 4:
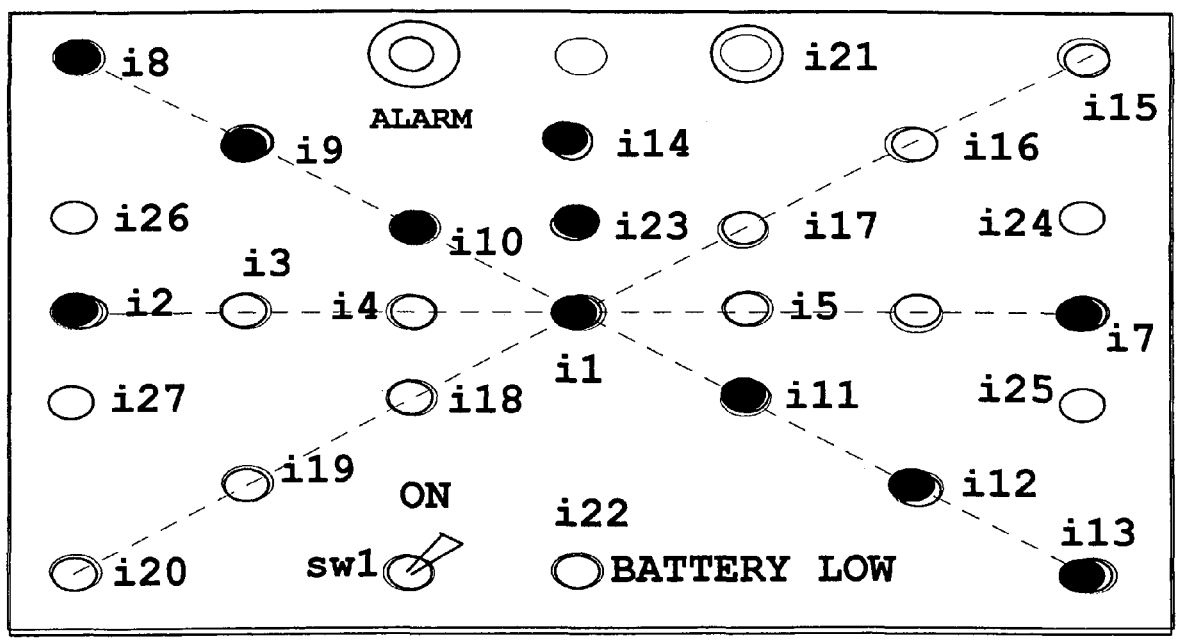
FIG. 4 illustrates the arrangement of activated indicator LED's when the aircraft is flying in a right bank flight that is greater than 20 to 30 degrees.
Figure 5:
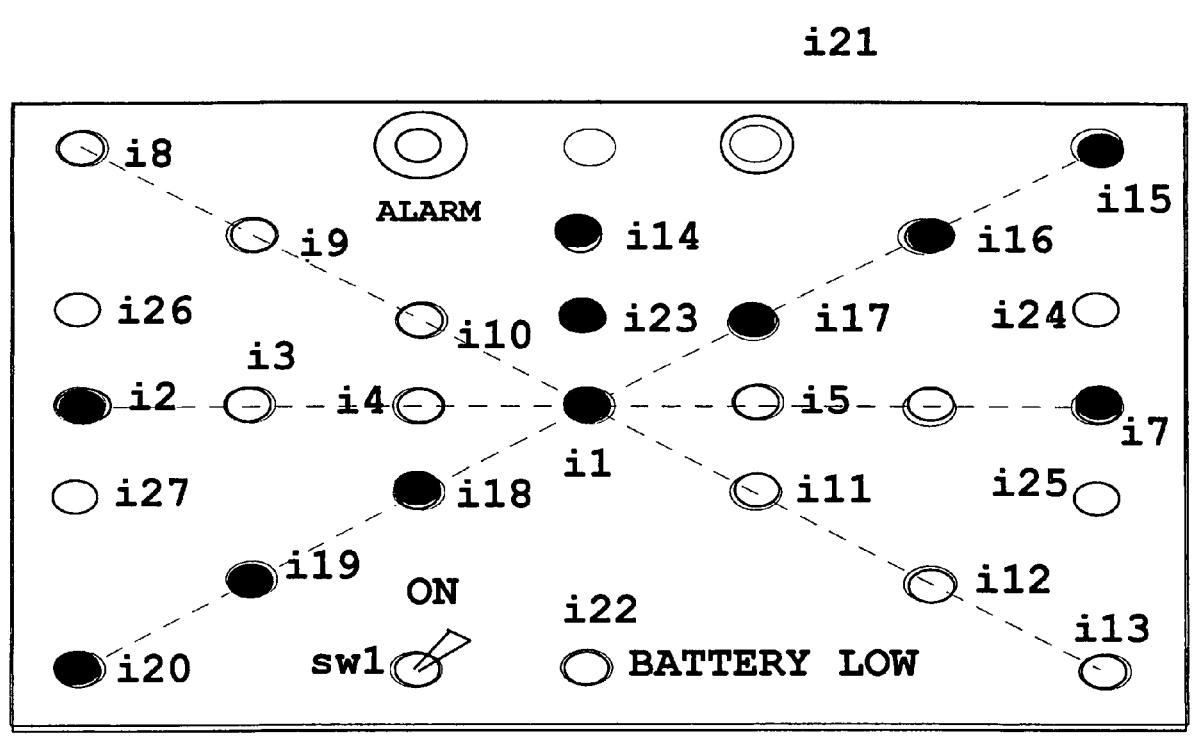
FIG. 5 illustrates the arrangement of activated indicator LED's when the aircraft is flying in the left bank flight that is greater than 20 to 30 degrees.
Figure 8:
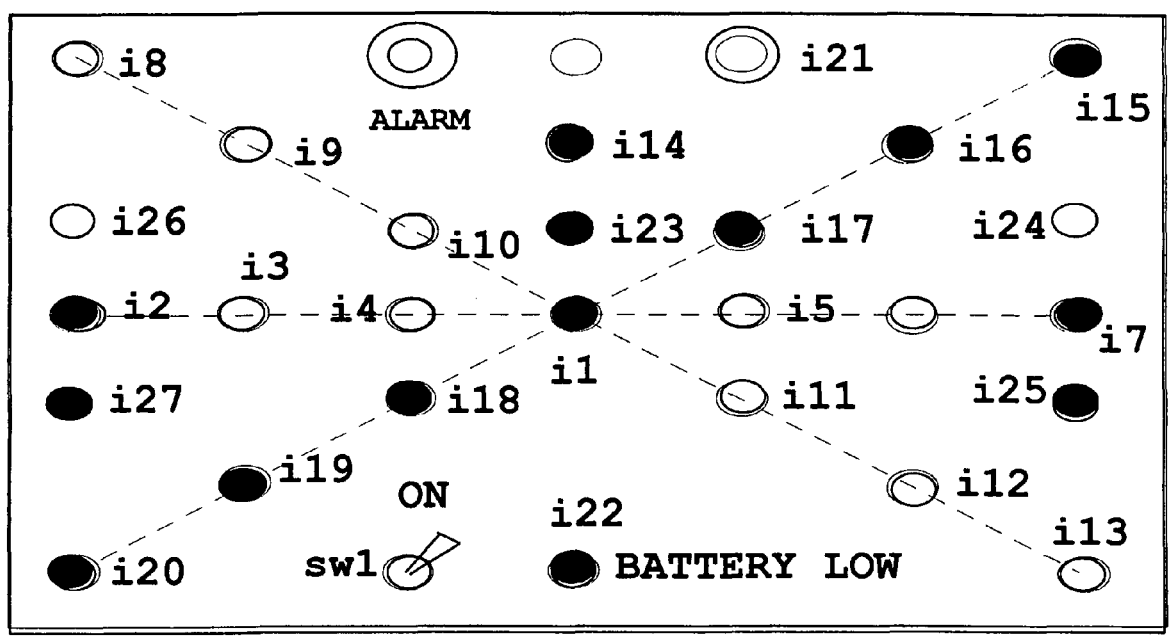
FIG. 8 illustrates the arrangement of activated indicator LED's when the aircraft is banking left, nose down, with a low battery also indicated.
Figure 9:
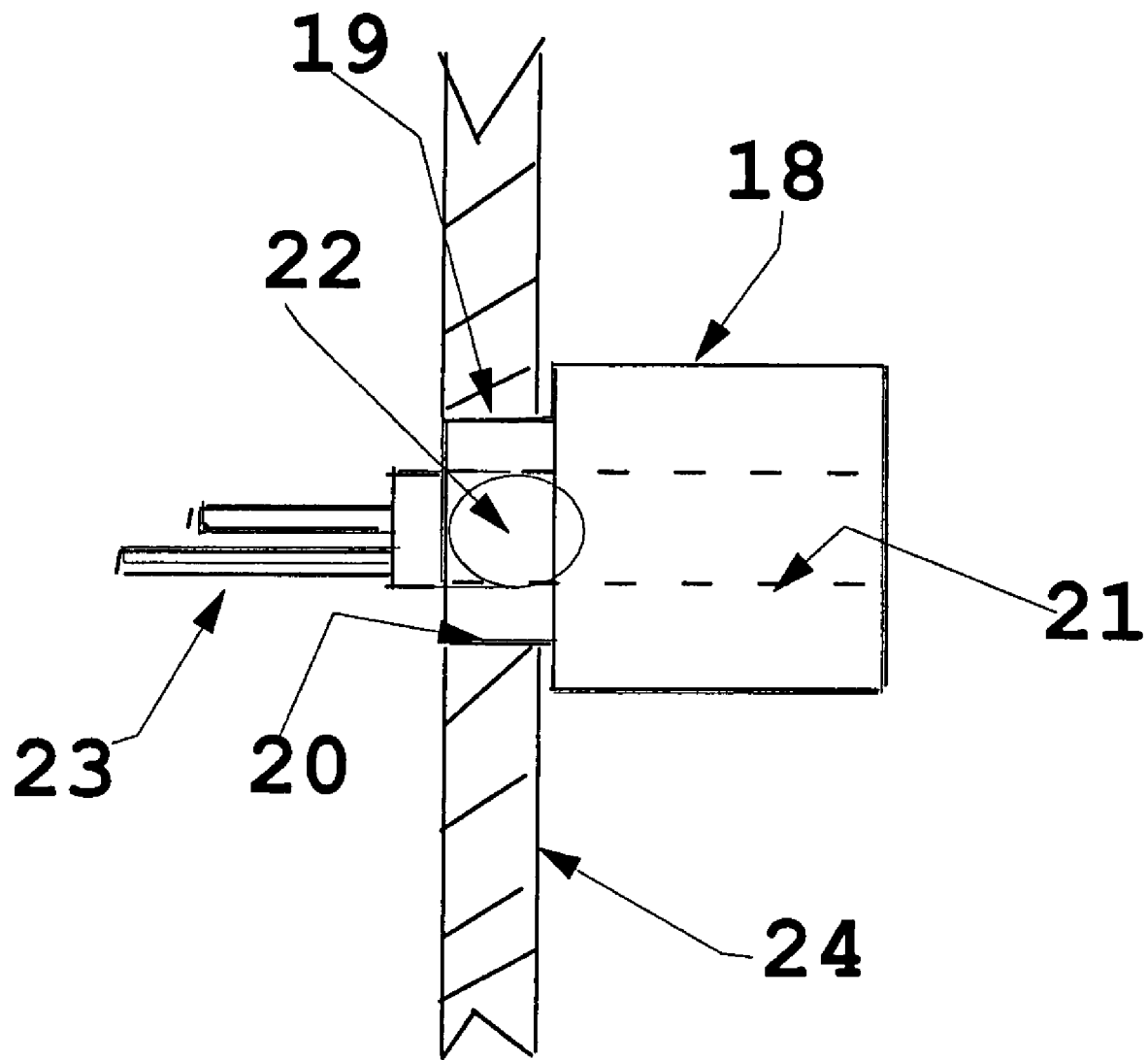
FIG. 9 illustrates an LED mounted in an individual light shield.

Referring to FIG. 1, there is illustrated the front panel display of the aircraft attitude indicator device of the present invention identifying the location of the different indicators, which are not numbered sequentially. When power is applied by the operation of SWI, the GREEN indicators (i14, i23, i1, i2, and i7) are illuminated. i2 and i7 represent a display of the reference attitude and i22 shows that the power is applied, but is of low voltage. This indicates that it is time to replace the internal batteries, or apply external power through J1, J2, and/or J3. Indicators i1, i23, and i14 represent the normal position of the rudder. The display of these indicators (i1, i23, and i14) is static when the aircraft changes attitude. Indicators i2 and 17 are fixed horizontal references. When the aircraft is flying straight and level, a plurality of GREEN indicators (i3, i4, i1, i5, i6 and i7), illustrated in FIG. 1, are presented as a full horizontal line. As the aircraft banks to the right, RED indicators (i8, i9, i10, i11, i12, and i13) are illuminated, as illustrated in FIG. 4. As the aircraft makes a left bank, the previous indicators shut down and RED indicators (i15, i16, i17, i18, i19 and i20) are illuminated. This is illustrated in FIG. 5. As the aircraft climbs, the BLUE indicators (i24 and i26) are illuminated. When descending, YELLOW indicators (i25 and i27) are illuminated. In addition, all indicators are mounted within an individual display tube (18) which may be plastic, or metal, and in which the interior surface is painted flat black, chrome, or left as natural aluminum. This tubular member is used to enhance contrast and visibility of the LED or low voltage, low current (grain or wheat) incandescent lamps, hereafter simply called "incandescent lamps" (22) in high ambient light conditions. The tube assembly is shown in FIGS. 8 and 9. The tubular member is pressed fit into a bore in the invention housing. A large amber flasher (i21) indicator and audible alarm, reveals when the aircraft is inverted, upside-down, or in a stall condition. Blue indicators (i24 and i26) indicate when the aircraft is in a climbing attitude (nose up greater than 10 degrees). RED flashing or YELLOW indicators (i25 and i27), illustrated in FIG. 3, are used to indicate a nose down greater than 10 degrees. These indicators can be used as an assist in landing the aircraft. An upside down condition often cannot be discerned by the pilot, especially when he is flying in a thick fog or in the dark of night. The indicator may save the pilot's life.

When the aircraft executes a LEFT BANK, and exceeds 30 degrees, a bank of RED indicators on the front panel (indicators i20, i19, i18, i17, i16, and i15) illuminate, generating a line of indicators which present a straight line at about 45 degrees, slanted to illustrate a left bank condition. This condition is shown in FIG. 5.

Figure 6:
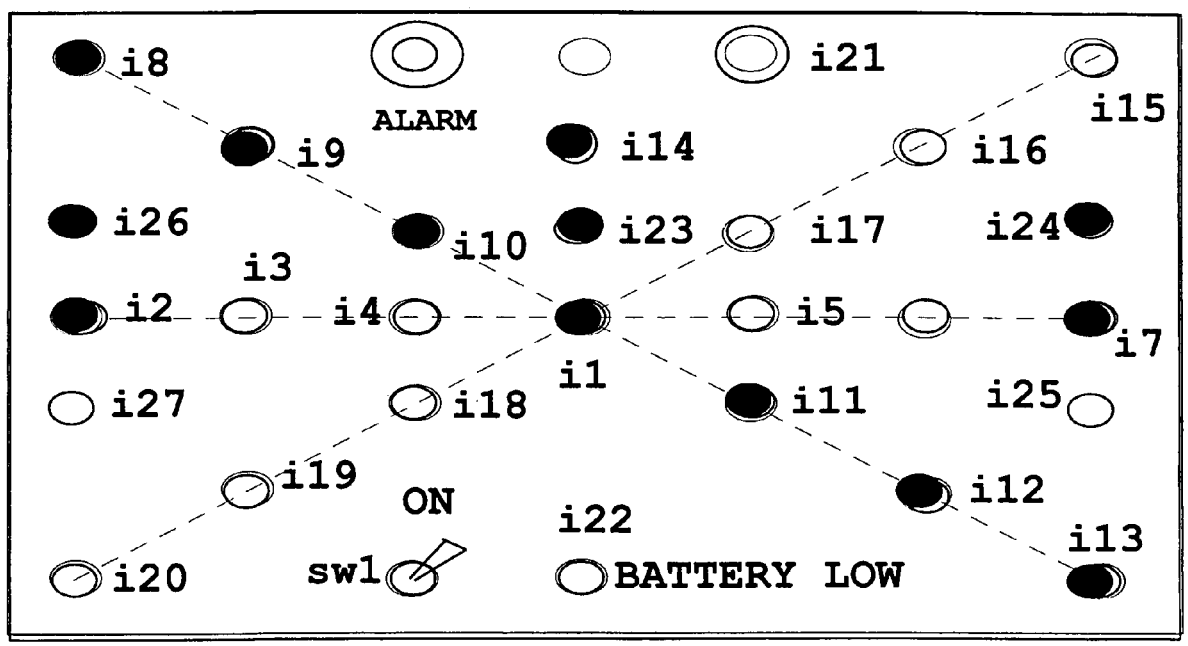
FIG. 6 illustrates the arrangement of activated indicator LED's when the aircraft is flying in a right bank, nose up attitude that is greater than 20 to 30 degrees.

When the aircraft executes a RIGHT BANK, and exceeds 30 degrees, a bank of RED indicators on the front panel illuminate, generating a line of indicators (Indicators i13, i12, i11, i10, i9 and i8) which present a straight line at about 45 degrees, slanted to illustrate a right bank condition. This condition is illustrated in FIG. 6.

For either a right or left bank, when the bank reaches or exceeds 10 degrees, and is less than 30 degrees, the bank indicators may change color or flash, alerting the pilot that he is executing a bank. At 30 degrees, the flashing or color will revert to steady RED.

For either a left bank, or a right bank, when the bank reaches approximately 40 degrees a warbling or pulsating audible alarm sounds, telling the pilot that his bank is becoming excessive and this is a dangerous condition. One limitation of this device is that the bank indicators can be confusing. Since the indicator lights are physically fixed at 45 degrees on the front panel, these indicators do not display the actual bank. That is solved by illuminating these lights at 30 degrees. However, it is important for the pilot to know when he is entering a banked condition. The sensor is equipped to provide an output when either the right or left bank is 10 degrees. This output can initiate flashing of either the right or left bank indicators.

Alternatively an LED with a dual color output can be employed. For example, the 45 degree line of indicators can be YELLOW/GREEN at 10 degrees, and convert to RED when the left or right bank is 30 degrees or more.

When the aircraft is flying level, the green reference indicators (i2, i7, i23, and i14) mentioned above, remain illuminated, but when the nose is pitched up by approximately 30 degrees, the blue indicators i26, and i24 flash and a warbling alarm sounds to indicate the possibility of a stall condition. FIG. 6 illustrates the BLUE indicators.

If the nose is pointing down by more than 20 degrees, YELLOW indicators (i25 and i27) illuminate to reveal a nose-down condition. If the nose-down condition exceeds 30 degrees, there is a warbling alarm sound and amber indicator (i21) flashes.

Figure 7:
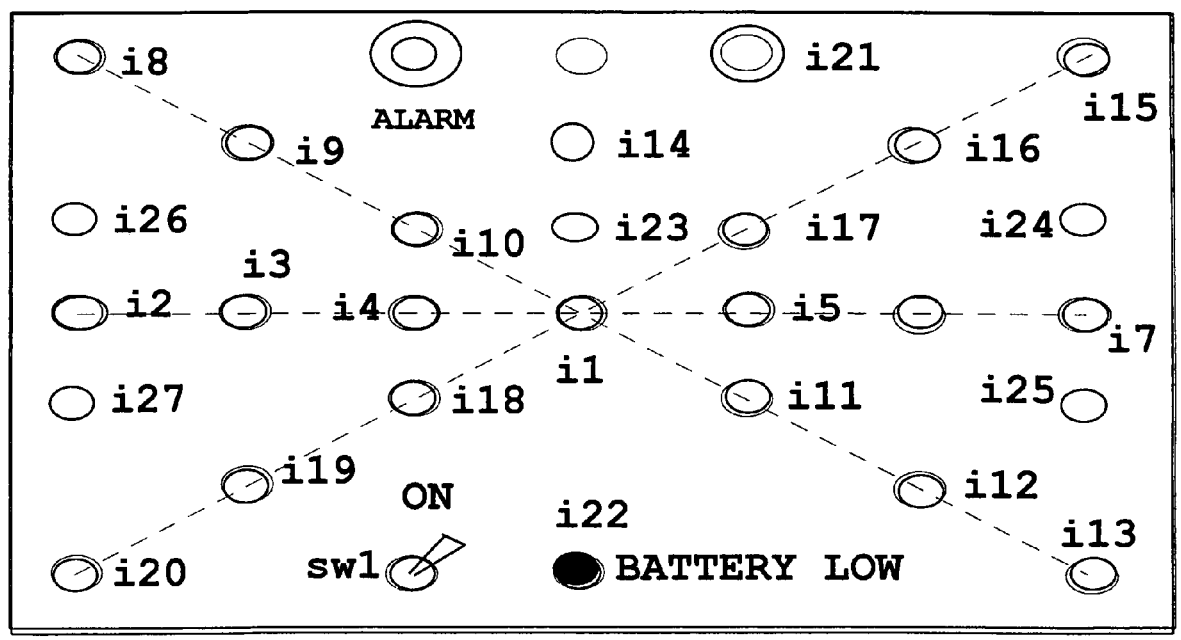
FIG. 7 illustrates the low battery display.

Other indicators include an amber or yellow indicator which tells the pilot that the internal batteries are low. For example, "LOW BATT" (i22), seen in FIG. 7. This indicator may flash to get the pilot's attention. If the 6 volt power buss falls below 5 volts, the low battery indicator i22 is illuminated. The system is fully functional as low as 4.2 volts, allowing sufficient operating time to replace the batteries.

Power is supplied by four AA carbon-zinc batteries, or four AA alkaline rechargeable batteries. Batteries may be "AA", "A", "C", OR "D". Provision is also made to accommodate four Nickle Cadmium batteries if desired. In this case, the device shall include a small constant current charger, deriving power from the aircraft power supply (usually 14 or 28 volts).

The instant invention may be modified for 48 volt external operation by removing an internal jumper, or directly by applying an external 12, 24, or 6 volts power supply through jacks provided for this purpose.

FIG. 9 illustrates the detail of the tubes designed to eliminate the effect of high ambient light on the Simplified Self Powered Survival Attitude Indicator of the present invention. A plastic or metal tube assembly or shield (18) is machined to contain a mounting shoulder (19) which is sized to provide an interfering ring that is press fitted into a panel bore (20) in the housing of the present invention. An incandescent bulb or LED (22) is mounted within the housing. Electrical connections to the illuminating device (22) are shown as item (23). It is understood that where an LED is described, the indicator may also be an incandescent "grain of wheat" aircraft bulb. LED's are mentioned for clarity or brevity. When an incandescent lamp is used, the current limiting resistors (470 Ohms) are not required.

Instead of the individual light-blocking tubes, the front panel may be made of a heavy aluminum or plastic blank. Typically, this blank may be 0.25 or 0.375 inches thick.

The present invention can be mounted on a section of panel. A hook and loop pad provides attachment and some vibration protection.

Identification of the indicators is as follows: These may be incandescent or LED's

| SYMBOL | COLOR | INDICATES |
| --- | --- | --- |
| i1 | GREEN | Power ON |
| i2 and i7 | GREEN | Horizontal Reference Indicators |
| i8-i13 | RED | Right Bank, green or flashing if 10 degrees |
| i14-i23 | GREEN | Rudder |
| i15-i20 | RED | Left Bank, green or flashing if 10 degrees |
| i21 | LARGE AMBER | Alarm Limit A) Stall with sound, flashing B) Excessive bank, Right bank or Left bank |
| i22 | RED or AMBER | Low Battery-flashing, and audio alarm |
| i24 | BLUE | Right Climbing Indicator |
| i25 | AMBER | Right Descending indicator |
| i26 | BLUE | Left Climbing indicator |
| i27 | AMBER | Left Descending indicator |

Note that although LED's are preferred because of their low operating voltages, low current requirements, high shock and vibration tolerance, and color, there are certain types of incandescent "grain of wheat" lamps that are of low power requirements, and capable of high shock and vibration. These lamps may be used, but the 470 ohm series current limiting resistors may be changed accordingly.

Figure 10:
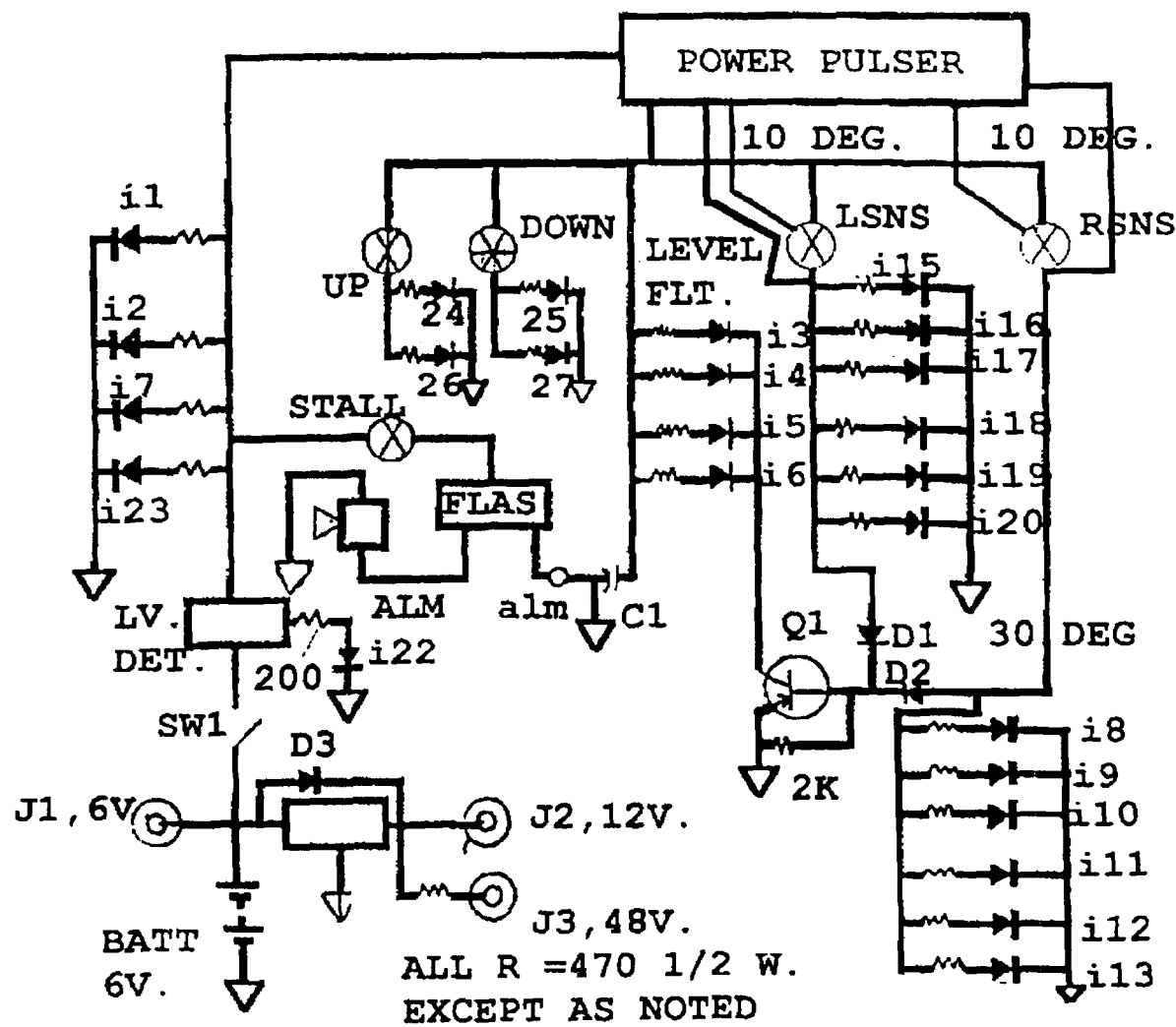
FIG. 10 is a schematic diagram of the Simplified Self-Powered Survival Attitude Indicator described herein.
Figure 11:
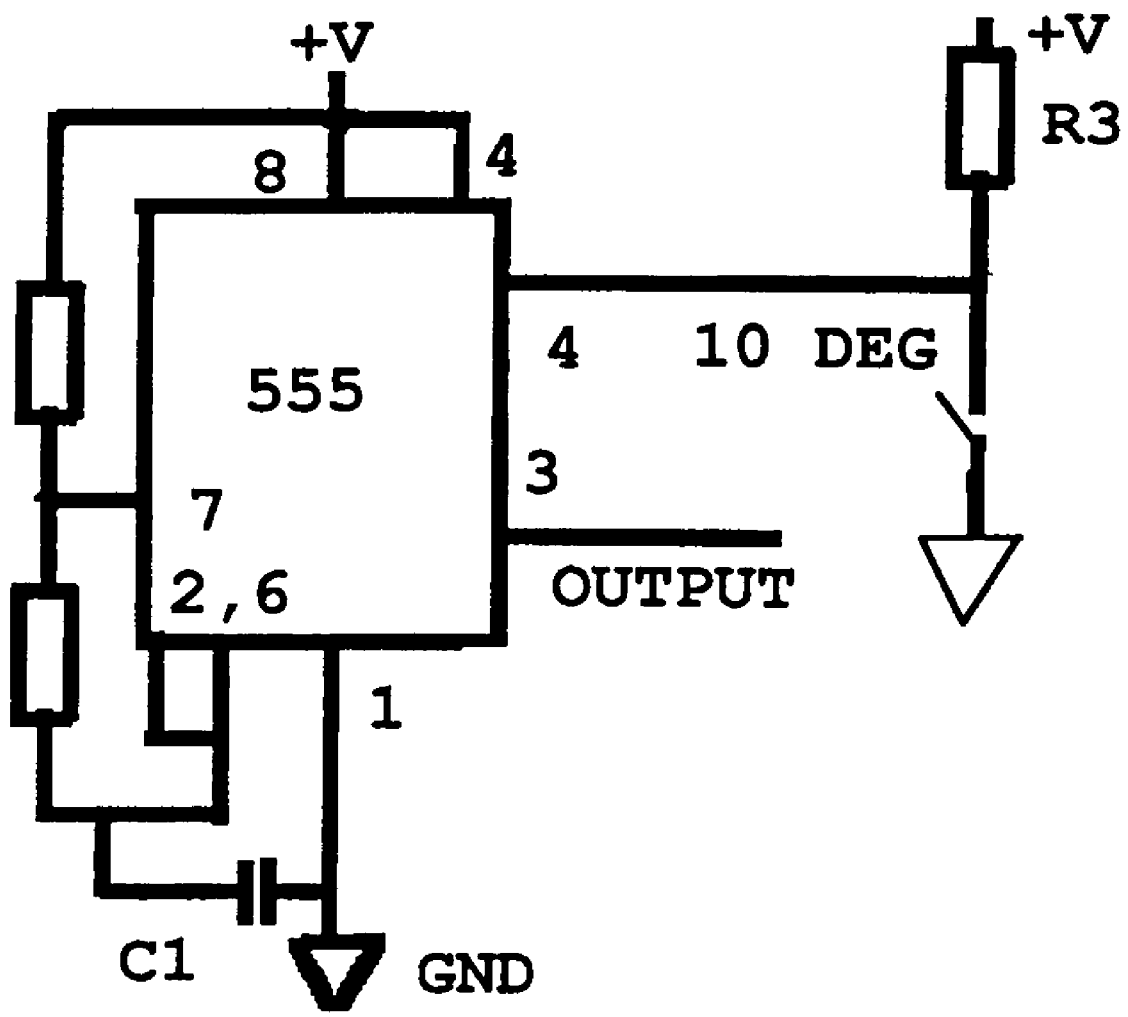
FIG. 11 is a diagram of the flasher power circuit.
Figure 12A:
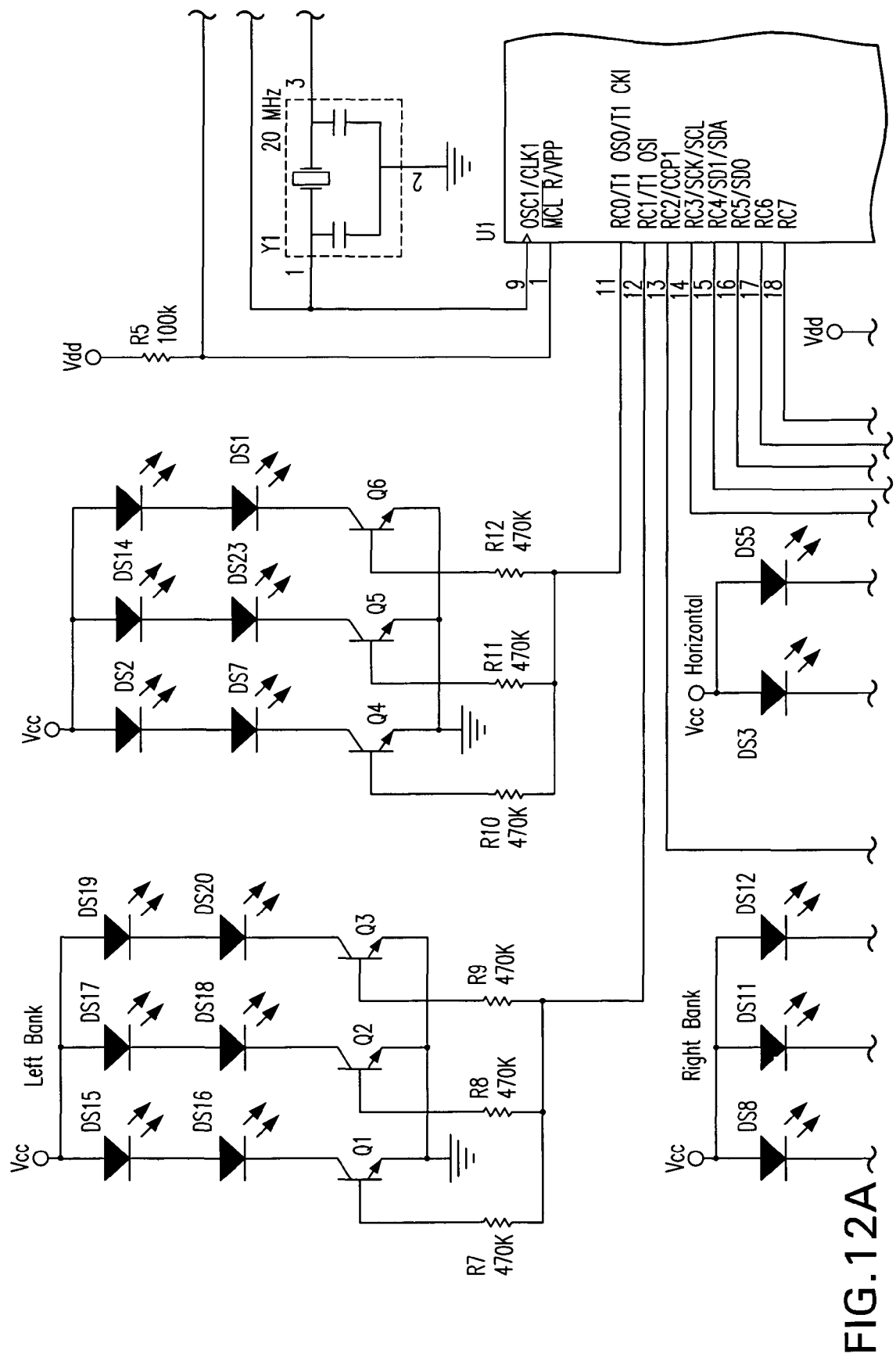
FIGS. 12A-12D show a schematic diagram of another embodiment of the Simplified Self-Powered Survival Attitude Indicator.
Figure 12B:
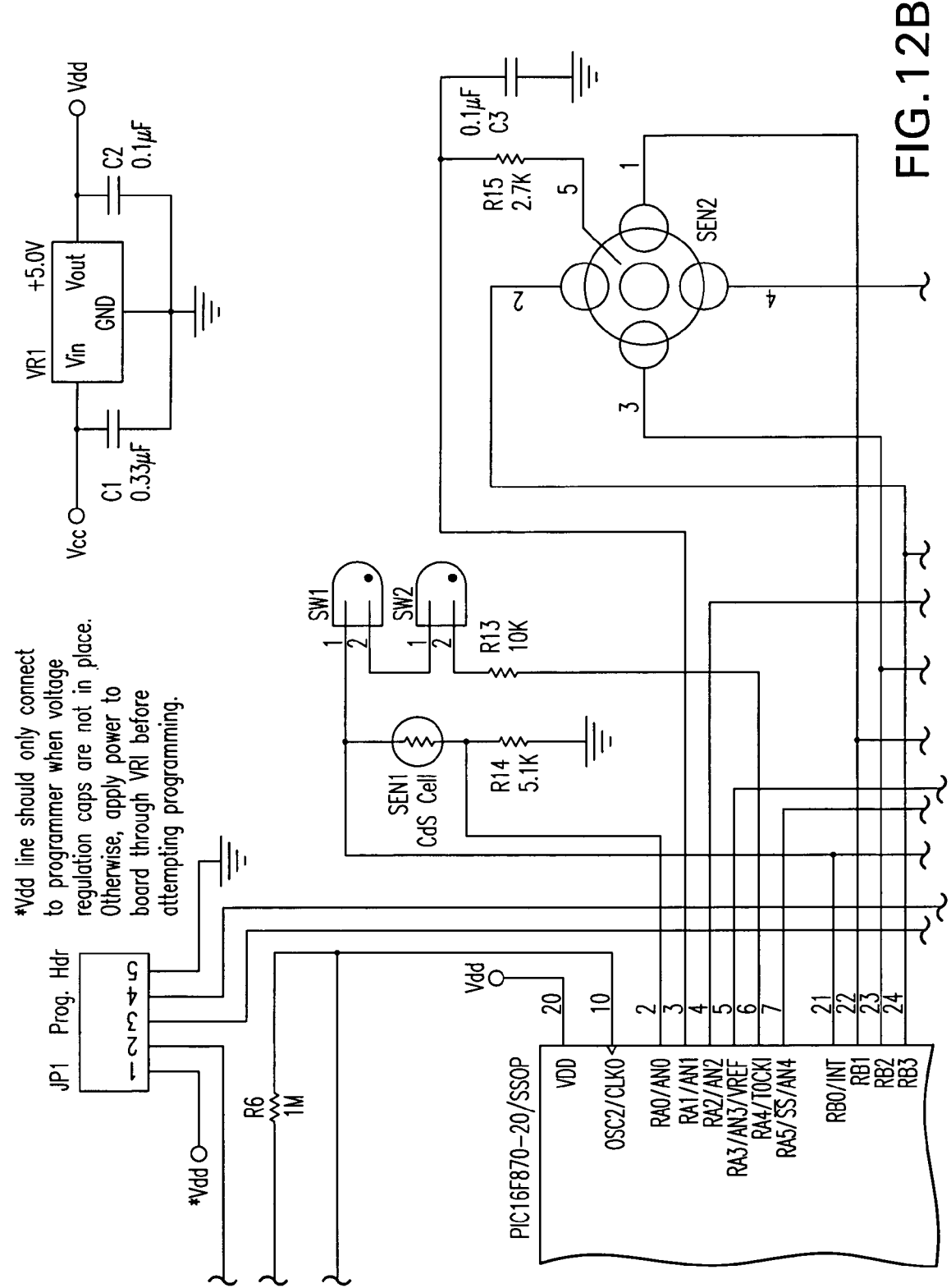
Figure 12C:
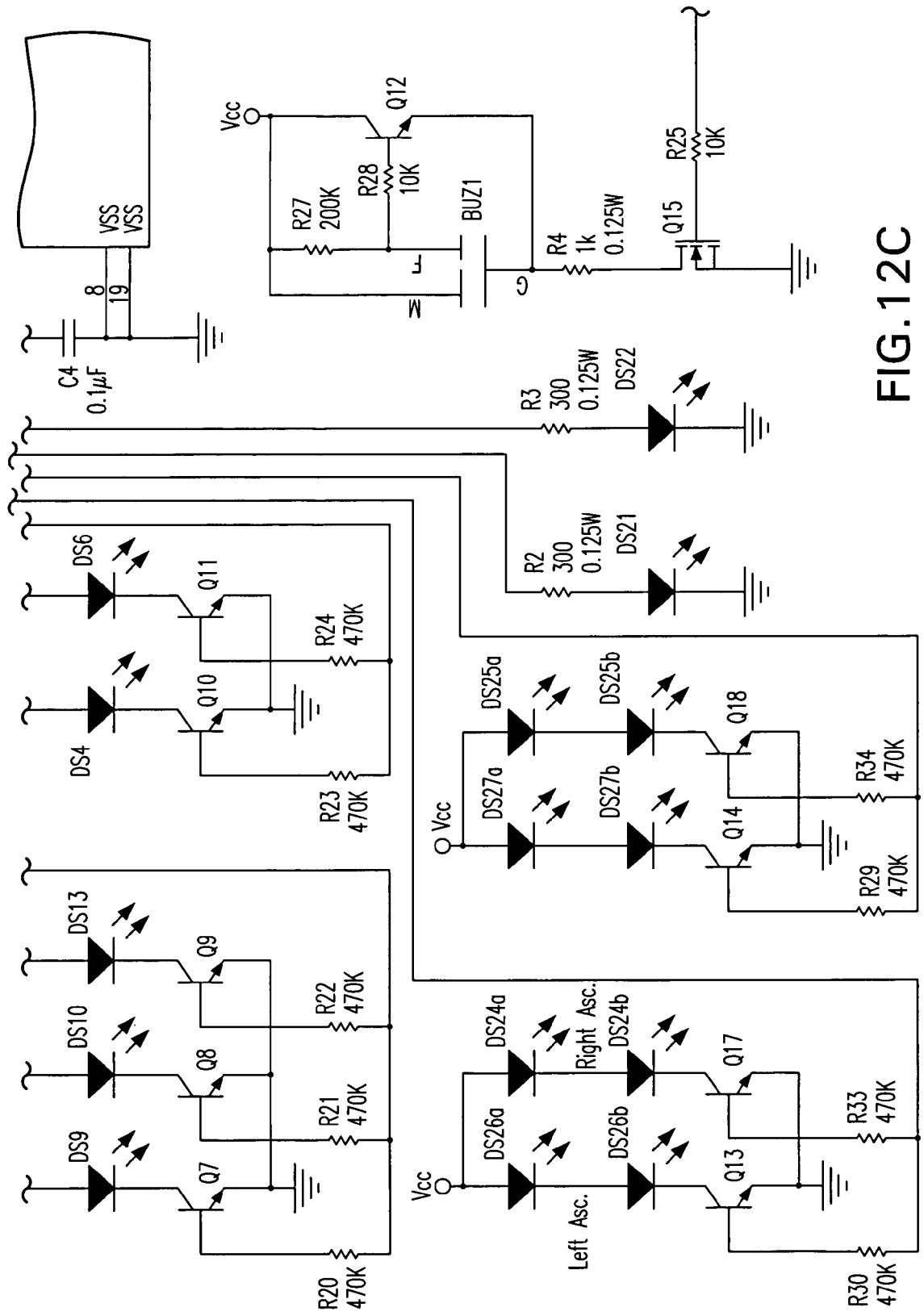
Figure 12D:
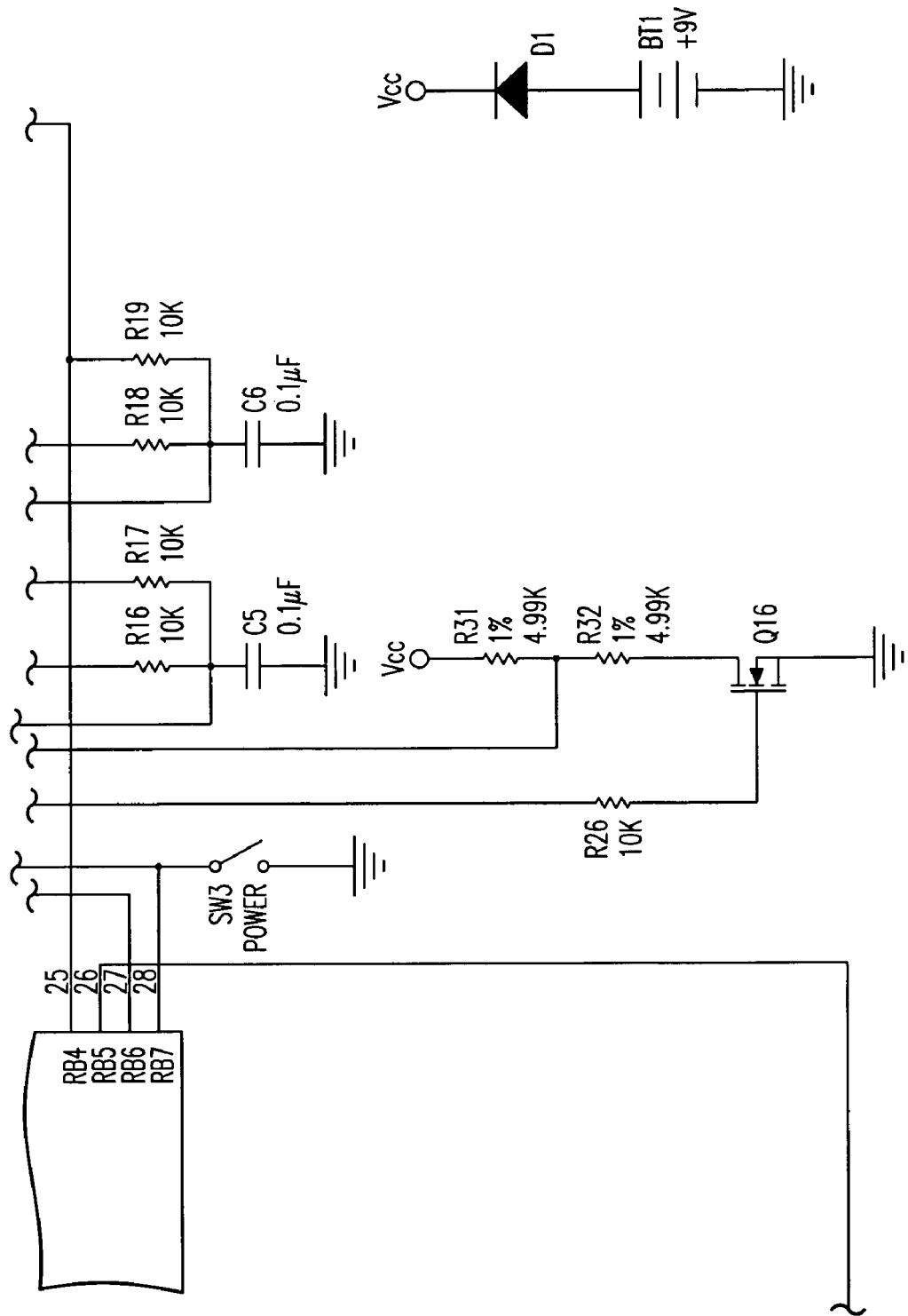

FIG. 10 is the functional schematic of the simplified self powered attitude survival indicator. FIG. 11 is the schematic of the pulse generator for operating the indicators between 10 and 30 degrees. If the 555 chip is used, then two separate identical circuits are used. A 556 chip may be used for both circuits. FIG. 12 is a functional schematic of another embodiment of the Simplified Self-Powered Attitude Survival Indicator.

Although this invention has been shown and described with respect to detailed embodiments thereof, it will be appreciated and understood by those skilled in the art that various changes in form and detail thereof may be made without departing from the spirit and scope of the claimed invention.

What is claimed is:

1. An aircraft attitude indicator device comprising:
a portable housing;
a plurality of attitude sensors within said housing and said attitude sensors being structured and disposed to sense attitude of an aircraft including a level attitude, a nose up attitude, a nose down attitude, a right bank attitude, and a left bank attitude;
at least one audible alarm contained within said housing, and said audible alarm being activated when at least one of said plurality of attitude sensors senses a dangerous attitude;
a front display panel on said housing;
a plurality of linear arrangements of light emitting indicators on said front display panel for providing a visual indication of the aircraft attitude sensed by said plurality of attitude sensors, each of said plurality of linear arrangements of light emitting indicators having at least four light emitting indicators, and said plurality of linear arrangements of light emitting indicators including:
a first linear arrangement of said light emitting indicators for indicating a level attitude;
a second linear arrangement of said light emitting indicators for indicating a right bank attitude; and
a third linear arrangement of said light emitting indicators for indicating a left bank attitude;
a first pair of spaced apart light emitting indicators of distinct color for indicating a nose up attitude;
a second pair of spaced apart light emitting indicators of distinct color for indicating a nose down attitude; and
said plurality of attitude sensors, said at least one audible alarm, said plurality of light emitting indicators, said first pair of spaced apart light emitting indicators and said second pair of spaced apart light emitting indicators being energized by a power source.

2. The device as recited in claim 1 wherein said plurality of attitude sensors include switches.

3. The device as recited in claim 1 wherein said plurality of attitude sensors include potentiometers.

4. The device as recited in claim 1 wherein said plurality of attitude sensors include accelerometers.

5. The device as recited in claim 1 wherein said plurality of attitude sensors include mercury switches.

6. The device as recited in claim 1 further comprising a power switch for closing a circuit to energize said plurality of attitude sensors, said at least one audible alarm and said light emitting indicators.

7. The device as recited in claim 1 further including fastening elements for removably securing said device within an aircraft so that said front display panel is readily visible to a pilot of the aircraft.

8. The device as recited in claim 1 wherein said light emitting indicators are structured to change color to indicate both a safe attitude and a dangerous attitude.

9. An aircraft attitude indicator device comprising:
a portable housing;
a plurality of attitude sensors within said housing and said attitude sensors being structured and disposed for sensing attitude of an aircraft when said device is carried therein including a level attitude, a nose up attitude, a nose down attitude, a right bank attitude, and a left bank attitude;
at least one alarm contained within said housing, and communicating with said plurality of attitude sensors, and said alarm being activated when at least one of said plurality of attitude sensors senses a dangerous attitude;
a front display panel on said housing;
a plurality of linear arrangements of light emitting indicators on said front display panel for providing a visual indication of the aircraft attitude sensed by said plurality of attitude sensors, each of said plurality of linear arrangements of light emitting indicators having at least four light emitting indicators, and said plurality of linear arrangements of light emitting indicators including:
a first linear arrangement of said light emitting indicators for indicating a level attitude:
a second linear arrangement of said light emitting indicators for indicating a right bank attitude; and
a third linear arrangement of said light emitting indicators for indicating a left bank attitude;
a first pair of spaced apart light emitting indicators of distinct color for indicating a nose up attitude;
a second pair of spaced apart light emitting indicators of distinct color for indicating a nose down attitude; and
said plurality of attitude sensors, said at least one audible alarm, said plurality of light emitting indicators, said first pair of spaced apart light emitting indicators and said second pair of spaced apart light emitting indicators being energized by an electric power source.

10. The device as recited in claim 9 wherein said plurality of attitude sensors include switches.

11. The device as recited in claim 9 wherein said plurality of attitude sensors include potentiometers.

12. The device as recited in claim 9 wherein said plurality of attitude sensors includes accelerometers.

13. The device as recited in claim 9 wherein said plurality of attitude sensors include mercury switches.

14. The device as recited in claim 9 wherein said light emitting indicators are structured for changing color to indicate a safe attitude and a dangerous attitude.

15. The device as recited in claim 1 wherein said power source is an internal power source located within said portable housing.

16. The device as recited in claim 9 wherein said power source is an internal power source located within said portable housing.

* * * * *